United States Patent [19]

Steckel

[11] Patent Number: 5,655,480
[45] Date of Patent: Aug. 12, 1997

[54] ANIMAL CONTROL LITTER

[75] Inventor: Ralph J. Steckel, Plano, Tex.

[73] Assignee: Pet Ecology Brands Inc., Dallas, Tex.

[21] Appl. No.: 678,240

[22] Filed: Jul. 11, 1996

[51] Int. Cl.$^6$ ................................................ A01K 1/015
[52] U.S. Cl. .................................................. 119/171
[58] Field of Search ........................... 119/171, 172, 119/173

[56] References Cited

U.S. PATENT DOCUMENTS

| | | | |
|---|---|---|---|
| 5,207,830 | 5/1993 | Cowan et al. | 119/171 |
| 5,295,456 | 3/1994 | Lawson | 119/172 |
| 5,303,676 | 4/1994 | Lawson | 119/173 |
| 5,421,291 | 6/1995 | Lawson et al. | 119/173 |

*Primary Examiner*—Thomas Price
*Attorney, Agent, or Firm*—W. J. Scherback

[57] ABSTRACT

An animal control litter comprised of an expanded light weight aggregate, a clumping agent, a surfactant and an odor control agent.

6 Claims, No Drawings

ANIMAL CONTROL LITTER

BACKGROUND OF THE INVENTION

1. Field of the Invention

This invention relates to an animal litter in which a light weight aggregate acts as a carrier for a clumping agent, a surfactant and an odor control agent.

2. Brief Description of Related Art

Because of the growing number of domestic animals used as house pets, there is a need for litters so that the animals may void or otherwise eliminate liquid or solid waste indoors in a controlled location. However, inevitably, waste build-up leads to malodor production.

In order to be useful in animal litter, materials must have good water or moisture absorbency and should have the capacity to eliminate or substantially reduce odors, particularly ammoniacal odors which normally result from animal waste.

Various clays, such as those based on the clay minerals kaoline, illite, attapulgite and the like have been used extensively in animal litter compositions due to their water and moisture absorbing properties. However such clays have very little, if any deodorizing properties. Furthermore they present disposal problems and add to the land-fill dilemma in many urban areas. Other clay-based litters are heavy making them difficult to physically carry and to dispose of.

Efforts to reduce ammoniacal odors have resulted in the use of masking agents such as pine oil, but such agents have minimal effectiveness as a function of time and sometime with negative effect, such as the animal resisting using the litter because the fragrance while pleasant to humans is offensive to the animal, particularly cats.

It is an object of the present invention to provide a light weight animal control litter that is organic and may be disposed of by flushing the litter down a commode.

It is another object of the present invention to provide an animal control litter containing an odor free odor control agent which prevents the production of ammoniacal odors.

SUMMARY OF THE INVENTION

According to the present invention there is provided an animal control litter comprised of an expanded light weight aggregate which acts as a carrier for a clumping agent, a surfactant and an odor control agent and also acts to absorb the liquid excretions of the animal. The light weight aggregate is selected from the class consisting of perlite, vermiculite, herculite, rice hulls and zeolite. Perlite is the preferred aggregate. The clumping agent is polymeric viscosity modifier which enables the aggregate, when saturated with liquid waste, quickly to clump into a stable mass for easy removal from the dry litter.

The surfactant is an alkylphenol ethoxylate which provides the litter with an anti-tracking characteristic preventing the animal from carrying dust particles from the litter site to other areas.

The odor control agent is odorless and colorless. It is a proprietary composition sold under the trade name D-Odor. Being itself odorless. It does not mask the production of ammomical odors but prevents their production.

DESCRIPTION OF THE PREFERRED EMBODIMENT

The animal control litter of the present invention is a composition comprised of an expanded light weight aggregate, a clumping agent, a surfactant and an odor control agent. The composition is dust free, light weight and entirely organic. When the ti me comes a bio-clumped mass is scooped from the dry litter and flushed down the commode.

The litter composition of the present invention can be used in litter boxes or cages of household pets such as birds, cats, hamasters, gerbils and guinea pigs. In addition the litter composition may be useful for other pets such as rabbits and ferrets as well as laboratory animals such as rats and monkeys.

The light weight aggregate is selected from the class consisting of perlite, vermiculite, herculite, rice hulls and zeolite. Perlite is the preferred aggregate. It may initially be obtained from Harborlite Corporation. 1950 East "W" Ave, Vicksburg, Mont. 49097-0100 in grade (–6+16 millimeters). The perlite is then expanded to provide porous surfaces by heating the perlite to 1800 degrees F.

The clumping agent is a polymeric viscosity modifier available from Rhone-Poulenc, prospect Plains Road, Cranbury, N.J. 0851-7600 and sold under the trade name AgRho DR-2000. In order to enable the litter composition to agglomerate into a mass upon contact with animal urine the clumping agent is mixed with the litter composition, preferably in an amount ranging from about 1 percent to about 10 percent by weight of the litter composition.

The surfactant, preferably, is an alkylpenol ethoxylate sold under the trade name CHEMPRO S-100 by Chemorse, Ltd. of 4685 Merie Hay Road, Des Moines, Iowa 50322. The surfactant adds the property of anti-tracking to the composition thus preventing the carrying of portions of the composition from the litter box to other areas of the household.

The odor control agent is proprietary to the supplier who maintains it as a trade secret. It is available under the tradename D-ODOR from Enviro Chare America, Inc. P.O. Box 2226, Great Falls, Mont. 59403-2226. The agent is colorless and odor free. It performs the function of odor elimination, not as a coverup, such as a fragrance, which can be repulsive to cats, but prevents the formation of the ammoniacal odors.

A preferred formulation of the animal control litter of the present invention is as follows:

89.6 percent by weight of expanded aggregate
00.4 percent by weight of odor control agent
07.0 percent by weight of clumping agent
03.0 percent by weight of surfactant The composition is prepared by mixing the above components in the percentages given in apparatus which causes the odor control agent, the surfactant and the clumping agent to enter and to fill the pore in the expanded aggregate. The apparatus is a Continental Roto Mixer, Model V5, drum type roto. It rotates at 4 RPM. Every revolution provides 6 folds in the mixing action to assure that each particle of expanded aggregate is uniformly coated.

The composition is packaged or shipment in sealed bags which have been placed in cardboard shipping containers or pails so that the vibrations encountered in shipping do not cause the components to separate or to dry out any component.

Now that the invention has been described, modifications will occur to those skilled in the art and it is intended to cover such modifications which fall within the scope of the appended claims.

What is claimed is:

1. Animal control litter comprised of light weight aggregate expanded to form porous surfaces by subjecting the aggregate to a temperature of 1800 degrees F., a clumping agent, surfactant and an odor control agent.

2. The animal control litter of claim 1 in which said light weight aggregate is selected from the class consisting of perlite, vermiculite, herculite, rice hulls and zeolite.

3. The animal control litter of claim 1 in which the component parts are present in the following amounts, 89.6 percent by weight of expanded aggregate, 00.4 percent by weight of odor control agent, 07.0 percent by weight of clumping agent, 03.0 percent by weight of surfactant.

4. The animal control litter of claim 1 in which the odor control agent is D-ODOR, the surfactant is an alkylphenol ethoxylate and the clumping agent is AgRho DR-2000.

5. The animal control litter of claim 1 in which the light weight aggregate consists of perlite and vermiculite.

6. The method of manufacturing an animal control litter comprising the steps of subjecting an amount of perlite to a temperature of at least 1800 degrees F. to expand the perlite to form porous perlite, adding to the expanded perlite a clumping agent, a surfactant and an odor control agent, stirring the above named materials to add the agents and the surfactant to pores of the porous perlite.

* * * * *